(12) United States Patent
Haiki et al.

(10) Patent No.: US 7,465,386 B2
(45) Date of Patent: Dec. 16, 2008

(54) ELECTROLYTIC METHOD IN DIAPHRAGM-TYPE CELL

(75) Inventors: Kenji Haiki, Tokyo (JP); Kazuhiko Motoba, Ibaraki (JP); Hiroshi Oda, Ibaraki (JP)

(73) Assignees: Nippon Mining & Metals Co., Ltd., Tokyo (JP); Mitsui Mining & Smelting Co., Ltd., Tokyo (JP)

( * ) Notice: Subject to any disclaimer, the term of this patent is extended or adjusted under 35 U.S.C. 154(b) by 674 days.

(21) Appl. No.: 10/896,965

(22) Filed: Jul. 23, 2004

(65) Prior Publication Data

US 2005/0067299 A1 Mar. 31, 2005

(30) Foreign Application Priority Data

Sep. 30, 2003 (JP) .............................. 2003-340387

(51) Int. Cl.
*C25C 1/00* (2006.01)
*C25C 1/12* (2006.01)

(52) U.S. Cl. ...................... 205/560; 205/580; 205/582; 205/584

(58) Field of Classification Search ................. 204/263, 204/275.1; 205/580, 582, 584, 560
See application file for complete search history.

(56) References Cited

U.S. PATENT DOCUMENTS

| 893,472 | A | * | 7/1908 | Forget et al. ................. 204/261 |
| 3,737,381 | A | * | 6/1973 | White et al. ................. 204/263 |
| 4,282,082 | A | * | 8/1981 | Cook et al. .................. 204/237 |
| 4,738,762 | A | * | 4/1988 | Hedstrom et al. ........... 204/235 |
| 5,487,819 | A | * | 1/1996 | Everett ........................ 205/347 |

* cited by examiner

*Primary Examiner*—Alexa Neckel
*Assistant Examiner*—Zulmariam Mendez
(74) *Attorney, Agent, or Firm*—Birch, Stewart, Kolasch & Birch, LLP

(57) ABSTRACT

In a metal-winning method, copper ore or copper-ore concentrates is effectively hydraulically leached in a chloride leach liquor and the resultant leached liquor is diaphragm-electrolyzed. A chloride electrolyte containing $Br^-$ ions and the leached metals is subjected to a diaphragm-electrolysis in an electrolytic cell comprising an anode compartment (4) and a cathode compartment (3). A portion of the electrolyte in the anode compartment (4) is withdrawn from below an anode (2) of the anode compartment (4) and is returned to the leaching step so as to increase the oxidation potential of the chloride leach liquor.

8 Claims, 4 Drawing Sheets

ELECTROLYTIC METHOD IN DIAPHRAGM-TYPE CELL

This Non-provisional application claims priority under 35 U.S.C. § 119(a) on Patent Application No(s). 2003-340387 filed in Japan on Sep. 30, 2003, the entire contents of which are hereby incorporated by reference.

BACKGROUND OF INVENTION

1. Field of Invention

The present invention relates to a hydro-metallurgical process for producing metals by means of leaching a mineral, particularly a production process of base and precious metals from copper ore or copper-ore concentrates. More particularly, the present invention relates to a metal-winning method for effectively hydraulically leaching the copper ore or copper-ore concentrates, followed by electrolysis of the leached liquor using a diaphragm-type cell.

2. Description of Related Art

Most copper ores which are subjected to smelting are sulfide ores. Among them, chalcopyrite is the most frequently smelted. Meanwhile, the sulfide minerals may also be subjected to a hydrometallurgical process, which is roughly classified into an atmospheric pressure leaching method and a pressurized leaching method. Known atmospheric pressure leaching methods are an acid-leaching method and a halide-leaching method. The halide leaching method known in U.S. Pat. No. 5,487,819 (hereinafter simply referred to as the U.S. Patent) is a national U.S. phase application of PCT/AU93/00311 (WO94/00606).

The US Patent proposes leaching in a halide bath. This method is referred to as the INTEC method. One or more minerals are transferred from a high-oxidation potential zone to a low-oxidation potential zone during the halide leaching in an acidic pH region. The fundamental steps of the US Patent are illustrated in FIG. 1. The treatment of the respective steps is described in the US Patent as follows.

(1) Liquor is fed from the low-oxidation potential zone to an electrolytic cell and is rendered to high-oxidation potential by electrolysis. This liquor is transferred to the high-oxidation potential zone and is brought into contact with the mineral(s) so as to leach at least partly the metals of the mineral(s). The leached metals are transferred to the low-oxidation potential zone to convert the atomic valence of the leached metals to a low oxidation valence.

(2) The electrolyte is transferred from the low-oxidation potential zone to the electrolytic step. In this step, the electrolysis is performed to form at least one metal and to enhance the oxidation potential of the electrolyte. As a result, the electrolyte leaving the electrolytic step has higher oxidation potential than that transferred to the electrolytic step.

(3) The electrolyte, the oxidation-potential of which has been increased, is returned to the high oxidation-potential zone of the leaching step.

The U.S. Patent emphasizes such advantages as high productivity due to high cathode current-density, and the capability to leach such metals as gold. In the U.S. Patent, the diaphragm-electrolysis is carried out in such a manner that current is conducted through the diaphragm consisting of glass fiber and the like and surrounding an anode. The leach liquor is, for example, copper-chloride solution. The oxidizing agent, which creates the high oxidation-reduction potential in the solution having high Cl concentration, is $Cu^{2+}$, $Br_2$, $BrCl_2^-$ and the like. The chalcopyrite mineral can be totally leached, for example, by $Cu^{2+}$ as the oxidizing agent (Reactions (1) through (4)). The metallic compounds including gold, which remains in the leaching residue, can be totally leached by $Br_2$ and $BrCl_2^-$ (Reaction (18)). When copper is recovered from the liquor in step (2) mentioned above, $Cu^{2+}$ is reduced in the cathode compartment of the diaphragm-electrolytic cell. Simultaneously, $Cu^{2+}$ is formed in the anode compartment by the ionic oxidation of Cu, and $Br_2$ and $BrCl_2^-$ are formed by $Cl^-$ and $Br^-$. In step (3), $Br_2$ and $BrCl_2^-$ are returned to the leaching step of the high oxidation potential zone (14R, FIG. 1).

The liquor fed into the cathode compartment as electrolyte has high Cu concentration (FIG. 1, reference numeral 33; FIG. 2, reference numeral 52), which is then decreased in step (2). Subsequently, the electrolyte is passed through the diaphragm and is transferred to the anode compartment (FIG. 1, 70). The anolyte is present in the anode compartment, where $Cu^{2+}$, $Br_2$ and $BrCl_2^-$ are formed due to the electrolytic oxidation. The resultant catholyte is then withdrawn as described hereinabove. The liquor moves through the diaphragm by utilizing the pressure difference between the liquors separated by the diaphragm. The withdrawn liquor has oxidation-reduction potential (ORP) exceeding 600 mV (vs Ag/AgCl, the ORP mentioned below is also in terms of Ag/AgCl) and is hence so oxidative that all metals including gold can be leached from the copper-leached residue.

An oxidation reaction in the anode compartment proceeds by Equation 16, i.e., $Br^- + 2Cl^- \rightarrow BrCl_2^- + 2e$. The resultant $Br_2$ and $BrCl_2^-$ are used as the oxidizing agent in the leaching step.

Recovery of $Ag^+$ consists of two main steps. Namely, one of the steps is subjecting the leach liquor to Cu cementation so as to attain approximately 20 mg/L of the $Ag^+$ concentration. The other step is electrolyzing in the Ag recovery apparatus until from 1 to 2 mg/L of $Ag^+$ concentration is attained.

SUMMARY OF INVENTION

It turned out that the electric power loss and the loss of chlorine component are incurred in the method of the U.S. patent. The leaching efficiency by the U.S. patent was not as high as expected. The present inventors elucidated the reasons of these results and discovered the following.

Since the oxidation reaction in the anode compartment does not effectively proceed, the formation of the soluble $Br_2$ and $BrCl_2^-$ are not satisfactory. The $Cl_2$ gas is difficult to exist in the form of dissolved Cl in the liquor. Along with the phenomenon of unsatisfactory formation of $Br_2$ and $BrCl_2^-$, the $Cl_2$ gas is likely to form. The liquor, from which the $Cl_2$ gas generates, is difficult to use for leaching. In addition, since the formation of $Cl_2$ gas is result of non-formation of $BrCl_2^-$, the $Cl_2$ gas not only impedes the leaching but also incurs the chlorine loss. Although formation of $Cl_2$ gas can be suppressed by means of adding a large amount of $Br^-$ ions, the removal efficiency of $Ag^+$ ions in the leach liquor is decreased.

In the cementation step of silver, $Br^-$ is dissociated from the AgBr, and the $Br^-$ concentration increases with the lapse of the cementation. The potential of the Ag cementation reaction-system, therefore, varies to such a level that the $Ag^+$ cementation amount decreases. This leads to increasing the load of the Ag recovery step and increases the cost.

It is an object of the present invention to solve the problems described hereinabove, to enhance the oxidizing-reaction efficiency of $Br_2$, $BrCl_2^-$, and to enhance the leaching efficiency of metals from the ore.

It is also an object of the present invention to decrease the concentration of $Br^-$ ions, which exert influence upon the recovery efficiency of Ag by the Cu cementation, thereby enhancing the recovery efficiency of Ag.

In accordance with the objects of the present invention, there are provided the following methods for producing metal from mineral.

(1) A method for producing metals from a mineral, wherein the mineral or minerals are leached in a chloride leach liquor, and further a chloride electrolyte containing $Br^-$ ions and the leached metals are subjected to diaphragm-electrolysis in an electrolytic cell comprising an anode compartment and a cathode compartment, thereby electrolytically depositing one or more metals from the chloride electrolyte, characterized in that a portion of the electrolyte in the anode compartment is withdrawn from below an anode of the anode compartment and is returned to the leaching step so as to increase the oxidation potential of the chloride leach liquor.

(2) A method for producing metals from a mineral, wherein a mineral is passed through a high oxidation-potential zone to a low oxidation-potential zone and is subjected to the leaching in the chloride-containing solution having acid pH, comprising the following steps:

(a) bringing the mineral into contact with the liquor, which has been fed from the low-oxidation potential zone into the high-oxidation potential zone, thereby at least partly leaching the metals of the mineral, and transferring the leached metals to the low-oxidation potential zone, thereby converting the atomic valence of leached metals to a low oxidation potential;

(b) transferring the electrolyte from the low-oxidation potential zone to a diaphragm-electrolytic step, then performing electrolysis of the electrolyte in an diaphragm-type cell so as to form at least one metal and to enhance the oxidation potential of the electrolyte, and subsequently leaving the electrolyte from the electrolytic step, which electrolyte has higher oxidation-reduction potential than that transferred to the electrolytic step;

(c) returning the electrolyte having the higher oxidation-reduction potential, to the high oxidation-potential zone of the leaching step (a), characterized in that the electrolyte of the step (c), containing $Br^-$ ions is withdrawn from below the anode and is retuned to the high oxidation potential zone of the leaching step (a).

(3) A method for producing metals from a mineral according to (1) or (2) mentioned above, wherein the anode compartment is partitioned by a diaphragm in the electrolytic cell and is provided at its lower part with a liquor reservoir in the form of a cup having no diaphragm.

(4) A method according to claim (3), wherein the liquor reservoir is narrowed toward the bottom, and further the liquor is withdrawn from the lowest part of the liquor reservoir.

The present invention is hereinafter described with reference to the preferred embodiments.

DESCRIPTION OF PREFERRED EMBODIMENTS

In the method of the U.S. Patent, the products of the anode reactions are $Br_2$, $BrCl_2^-$ and $Cu^{2+}$, which are the oxidizing agent. The present inventors discovered that the liquor containing these reaction products has very high specific gravity and readily creates a downward flow immediately after the reactions on the electrode surface. The liquor having high specific gravity accumulates, therefore, in the lower part of the anode compartment. The conventional liquor withdrawal method is the overflow method, in which the liquor is withdrawn from the upper part of the anode compartment. The concentration of the oxidizing agent in the liquor returned to the high oxidation zone is, therefore, so low that the above-described drawbacks are incurred. In the present invention, the liquor withdrawal is carried out from the lower part of the anode compartment.

In the invention (2), such terms as high oxidation potential zone and low oxidation potential zone are intended to refer to the description of the U.S. Patent. Specifically, the high oxidation potential zone is a zone where copper is in the form of $Cu^{2+}$. The low oxidation potential zone is a zone where copper is in the form of $Cu^{1+}$. Minerals or ores are pyrite, molybdenite, arsenopyrite, chalcopyrite, pentlanite, corvellite, sphalerite, chalcocite, pyrrhotite, and galena, particularly chalcopyrite.

A liquor reservoir in the form of a cup is provided in the lower part of the anode compartment. The volume of the cup-shaped anode compartment is less than that of the conventional box-shaped anode compartment. The reaction efficiency of the former is, therefore, higher than that of the latter. The liquor reservoir according to the present invention is not communicated with the exterior except through the liquor withdrawal aperture. Corrosion-resistant resin plate and the like are shaped in the form of a cup. Preferably, a lower part of the liquor reservoir is so inclined that it is narrowed toward the bottom. The liquor is withdrawn from the bottom of the liquor reservoir. The liquor having high specific gravity accumulates in the cup-shaped liquor reservoir and is then effectively withdrawn.

The present invention achieves the following advantages.

(1) The anolyte reaction-efficiency is especially high. The oxidation-reduction potential (ORP) is as low as less than 500 mV in the conventional leaching cell. It is possible according to the present invention to maintain oxidation-reduction potential (ORP) exceeding 700 mV in the leaching cell. Leaching efficiency of the hard-to-leach precious metals is therefore enhanced.

(2) In the conventional method, the concentration of NaBr was 28 g/L because of low reaction efficiency. In the present invention, the reactions can be maintained at 24 g/L of NaBr. Accordingly, the feeding amount of NaBr, which is expensive, can be reduced, and, the removal of $Ag^+$ by the cementation is increased by 2 mg/L. The silver can, therefore, be recovered more effectively than by method of the prior art.

BEST MODE FOR CARRYING OUT INVENTION

The present invention is particularly preferably, applied to an electrolytic winning method of electrolytic copper. In this method, a diaphragm electrolytic cell is preferably separated into a plurality of the anode compartments and a cathode compartment by the diaphragms, each surrounding one of the anode compartments. The electrolyte is a chloride bath. Chalcopyrite is leached with the chloride solution and this solution is then fed into the cathode compartment. The fed liquor is subjected to the electrolytic reduction to win the electrolytic copper.

The copper concentration of the electrolyte decreases during the electrolysis in the cathode compartment and passes through the diaphragm into the anode compartments, where the $Br^-$ and $Cl^-$ ions are electrolytically oxidized to $Br_2$ and $BrCl_2^-$. As a result, the oxidation-reduction potential (ORP) is changed from 200 mV or less in the cathode compartment to more than 800 mV in the anode compartments. The liquor containing $Br_2$ and $BrCl_2^-$ is used to leach the leaching residue. As a result, all metals including Ag can be leached. The present invention is hereinafter described with reference to the examples.

EXAMPLE 1

Figure 1:
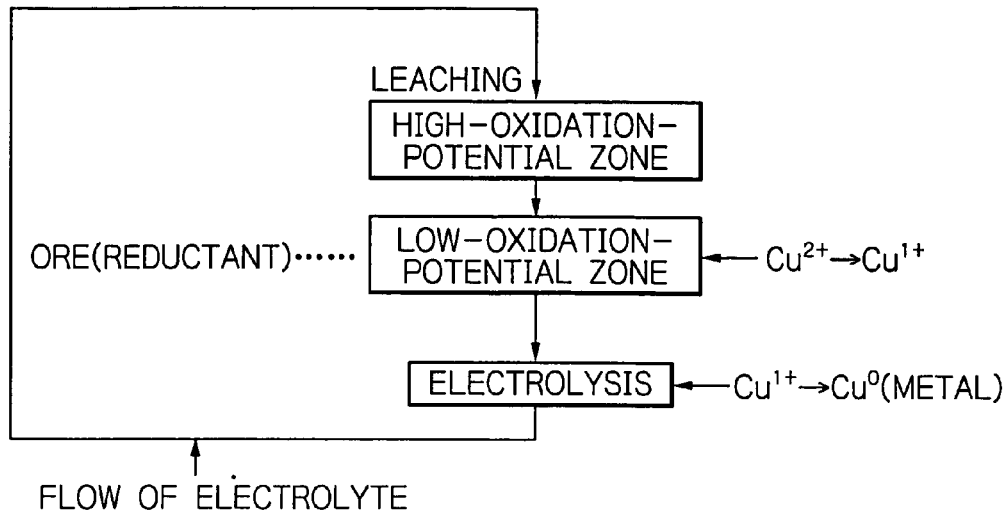
FIG. 1 shows the flow chart of the method disclosed in the U.S. Patent.
Figure 2:
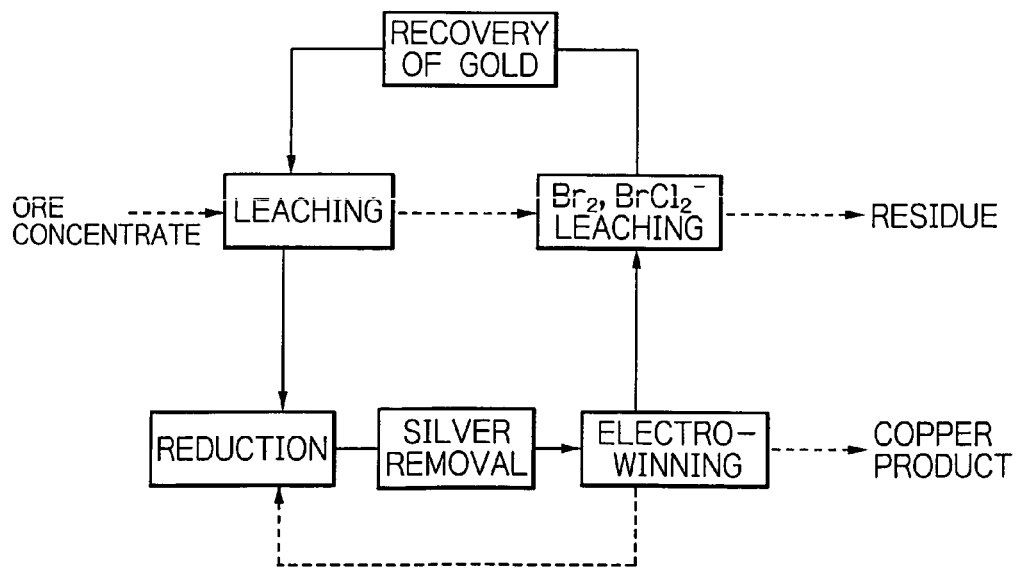
FIG. 2 shows the flow chart of leaching and electrolytic winning.

The leaching of the chalcopyrite and electrolytic winning of copper were carried out by the flow as shown in FIG. 2. Leaching of $Cu^{2+}$ and the $Br_2$ and $BrCl_2^-$ leaching shown in the flow chart of FIG. 1 were carried out under the conditions of Example 1 of the U.S. Patent. Recovery of Au was carried out following Example 3 of the U.S. Patent.

In the flow chart of FIG. 2, the solid line indicates the flow of liquor, while the dotted line indicates the flow of solid. The copper product of the electro-winning step is partially returned to the reduction step, where $Cu^{2+}$ is reduced to $Cu^{1+}$ by using the copper product. The returned $Cu^{1+}$ causes the cementation of Ag. The Ag concentration was decreased to slightly less than 20 mg/L in the reducing step.

Figure 3:
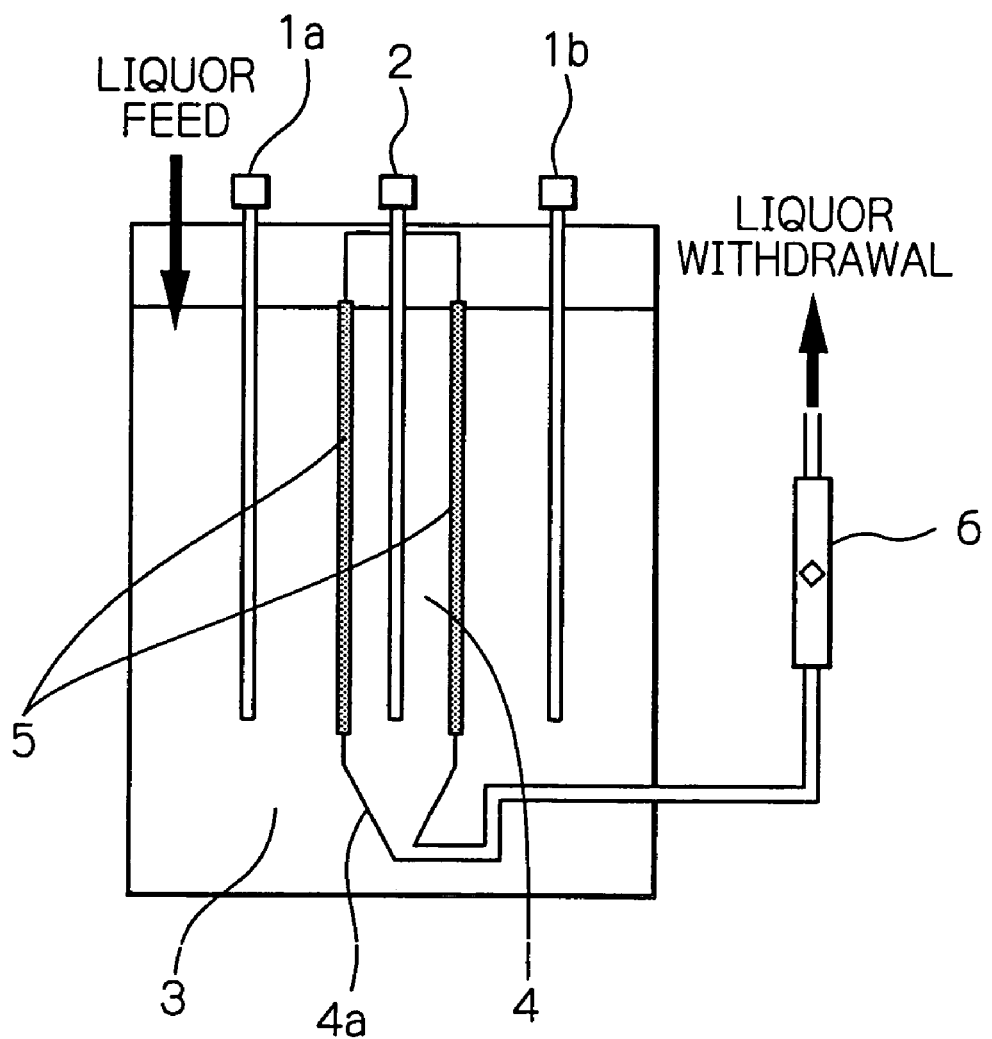
FIG. 3 is a schematic drawing showing one of the electrolytic cells.
Figure 4:
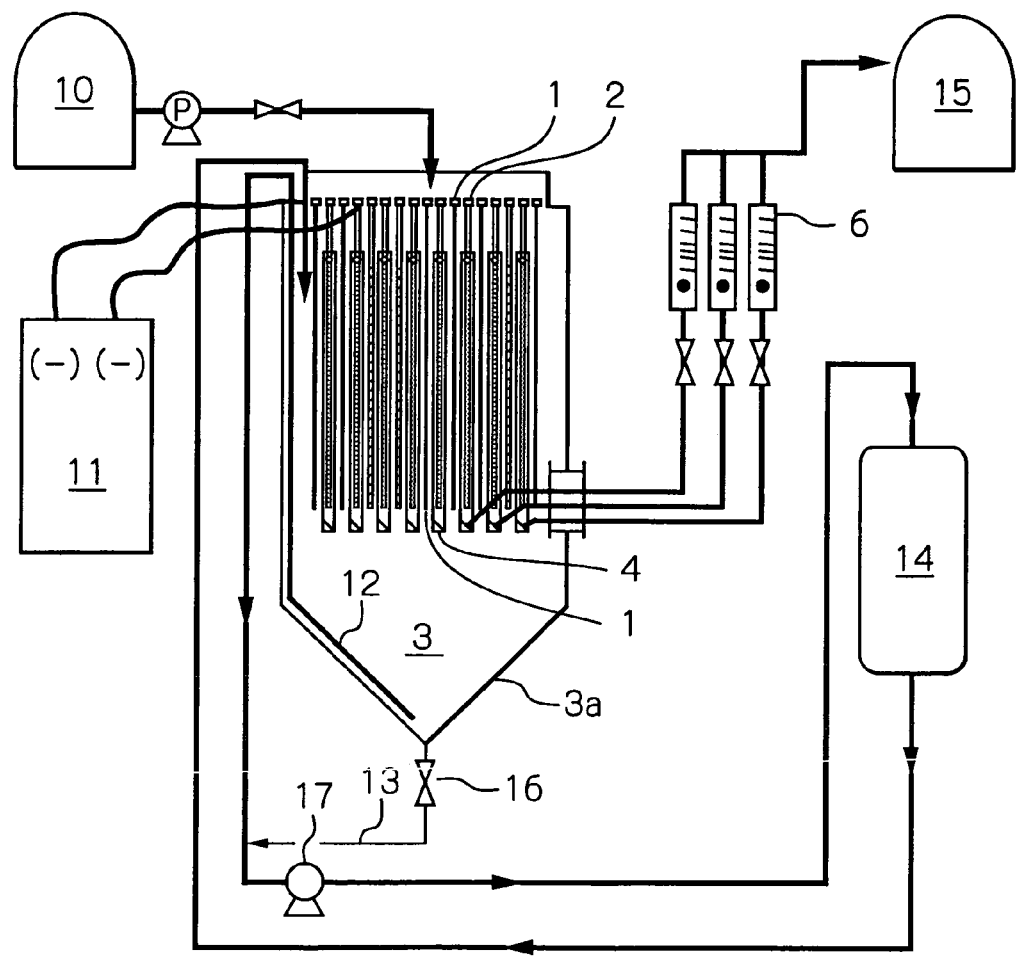
FIG. 4 shows a specific construction of the electrolytic cell apparatus.

The electrolysis was carried out using an electrolytic cell shown in FIGS. 3 and 4. The eight anodes 2 used were DSA (dimension stable anode) 1300×250×3 mm in size. The nine cathodes 1 used were Ti plate of the same size as the anodes 2. The anodes 2 and the cathodes 1 are connected to a rectifier 11. The anode compartment 4 was in the form of a box 1400×300×30 mm in size. A diaphragm 5 having size of 1040×270 mm is attached to both sides of the anode compartment 4. The cathode compartment 3 is narrowed toward the bottom at the lower part 3a. The catholyte is withdrawn through either one of the conduits 12 or 13 via a pump 17 and is purified by a filter 14 and is returned to the cathode compartment 3 at a specific position. Reference 16 denotes a valve. The anolyte is withdrawn from the respective anode compartments 4, via a flow meter 6, which controls the liquor withdrawal amount. The cup-shaped liquor reservoir 4a is shown in FIG. 3 but is omitted in FIG. 4 for the sake of clarity. The withdrawn anolyte is once reserved in the container 15.

The electrolytic winning was carried out under the conditions of: 1000 A/m$^2$ of the current density; 2.45 V of the voltage; 60° C. of the electrolyte temperature; 75 g/L of the Cu concentration in the fed liquor; and 25 g/L of the Cu concentration of the discharge liquor. The analytical values of the ore, the residue after leaching with the oxidizing agent $Cu^{2+}$, and the residue after leaching with the oxidizing agent $Br_2$, $BrCl_2^-$ are shown in Table 1 to show the experimental results. The leaching ratio was calculated by the following equation.

Leaching ratio (%)={(grade of concentrate)/(grade of finally leached residue)×100

The residue grade after leaching was calculated by the following equation.

Grade of residue after leaching={(residue amount×grade)/(ore amount×grade)}

Figure 5:
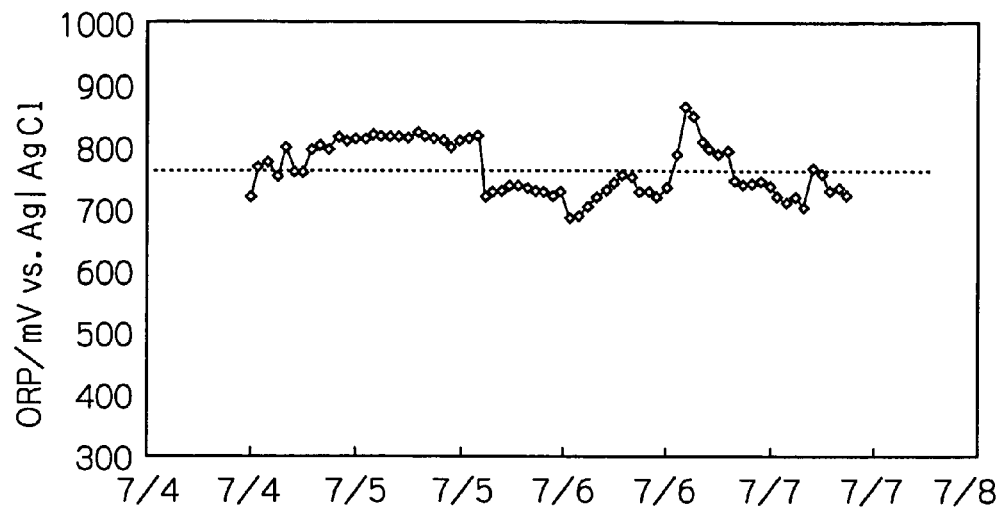
FIG. 5 is a graph showing the sequential ORP change of the leaching cell according to Example 1.

In addition, it is shown in FIG. 5 how the ORP sequentially changes with the $Br_2$ and $BrCl_2^-$ leaching in three days. Each day, the ORP is more than 700 mV, which indicates the improved leaching. In Table 1, the leaching results of Cu, Au and Ag are shown. The grades of residues indicate that the leaching ratio is more than 96%. In addition, the Ag concentration after the reduction step was 17 mg/L.

TABLE 1

|  | Ore | Grade of Residue after $Cu^{2+}$ Leaching | Grade of Residue After $Br_2$, $BrCl_2^-$ Leaching | Leaching Ratio |
| --- | --- | --- | --- | --- |
| Cu(%) | 29.7 | 1.7 | 0.5 | 98 |
| S(%) | 32 | 35.0 | 38.2 | — |
| Fe(%) | 28.9 | 33.9 | 34.0 | — |
| Au(g/T) | 5 | 5.7 | 0.2 | 96 |
| Ag(g/T) | 86 | 3.0 | 0.6 | 99 |

COMPARATIVE EXAMPLE 1

Figure 6:
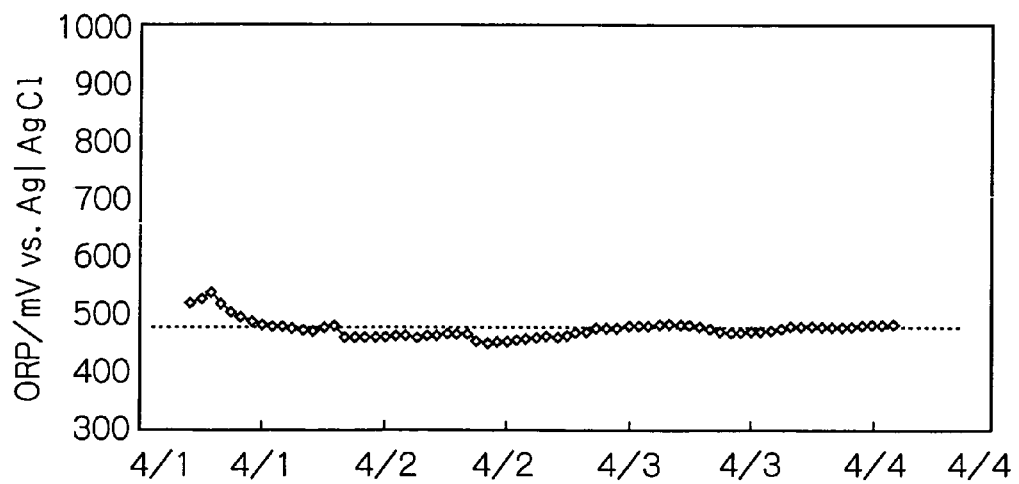
FIG. 6 is a graph showing the sequential ORP change of the leaching cell according to Comparative Example.

The same electrolytic cell and the electrodes as in Example 1 were used, except that the liquor of the anode compartment was withdrawn from the top. The test results are shown in Table 2. In addition, it is shown in FIG. 6 how the ORP sequentially changes with the $Br_2$ and $BrCl_2^-$ leaching in three days. In most days, the ORP is lower than 500 mV, which indicates the ORP is insufficient for the Au leaching. The results of Cu, Au and Ag leaching are shown in Table 2. The leaching efficiency of Au and Cu is low, probably because $Cl_2$ gas was generated during the oxidation in the anode compartment and hence the Cl ion concentration was low. In addition, the Ag concentration after the reduction step was 20 mg/L.

TABLE 2

|  | Ore | Grade of Residue after $Cu^{2+}$ Leaching | Grade of Residue After $Br_2$, $BrCl_2^-$ Leaching | Leaching Ratio |
| --- | --- | --- | --- | --- |
| Cu(%) | 30.1 | 3.9 | 2.9 | 90 |
| S(%) | 30.1 | 32.1 | 35.1 | — |
| Fe(%) | 28.8 | 31.0 | 32.0 | — |
| Au(g/T) | 4 | 4.8 | 1.4 | 65 |
| Ag(g/T) | 112 | 15.4 | 5.1 | 95 |

INDUSTRIAL APPLICABILITY

As is described hereinabove, the present invention enhances the hydrometallurgical recovery efficiency of valuable metals from copper ore(s).

The invention claimed is:

1. A method for producing metals from a mineral, wherein the mineral is leached in a chloride leach liquor, and further a chloride electrolyte containing $Br^-$ ions and the leached metals are subjected to a diaphragm-electrolysis in an electrolytic cell comprising an anode compartment and a cathode compartment, thereby electrolytically depositing a metal or metals from the chloride electrolyte, characterized in that a portion of the electrolyte in the anode compartment is withdrawn from below an anode of the anode compartment and is returned to the leaching step so as to increase the oxidation potential of the chloride leach liquor.

2. A method for producing metals from a mineral, wherein the mineral is passed through a high oxidation-potential zone to a low oxidation-potential zone and is subjected to a leaching in the chloride-containing solution having acidic pH, comprising the following steps:

(a) bringing the mineral into contact with the liquor, which has been fed from the low-oxidation potential zone into the high-oxidation potential zone, thereby at least partly leaching the metals of the mineral, and transferring the leached metals to the low-oxidation potential zone, thereby converting the atomic valence of leached metals to a low oxidation potential;

(b) transferring the electrolyte from the low-oxidation potential zone to a diaphragm-electrolytic step, then performing electrolysis of the electrolyte in a diaphragm-type cell so as to form at least one metal and to enhance the oxidation potential of the electrolyte, and subsequently leaving the electrolyte from the electrolytic step, which electrolyte has higher oxidation-reduction potential than that transferred to the electrolytic step; and, (c) returning the electrolyte having the higher oxidation-reduction potential, to the high oxidation-potential zone of The leaching step (a), characterized in that The electrolyte of the step (c), containing $Br^-$ ions is withdrawn from below the anode and is retuned to the high oxidation potential zone of the leaching step (a).

3. The method for producing metals from a mineral according to claim 1 or 2, wherein the anode compartment is partitioned by a diaphragm in the electrolytic cell and is provided at its lower part with a liquor reservoir in the form of a cup having no diaphragm.

4. The method according to claim 3, wherein the liquor reservoir is narrowed toward the bottom, and further the liquor is withdrawn from the lowest part of the liquor reservoir.

5. The method according to claim 1, wherein The chloride leach liquor comprises the withdrawn portion of The electrolyte used as oxidizing agent.

6. The method according to claim 2, wherein the oxidation-reduction potential of the electrolyte in the anode compartment is 700 mV or more.

7. The method according to claim 5, wherein the oxidation potential of the electrolyte in the anode compartment is 800 mV or more.

8. A method for producing metals from a mineral, wherein the mineral is leached in a chloride leach liquor, and further a chloride electrolyte containing $Br^-$ ions and the leached metals are subjected to a diaphragm-electrolysis in an electrolytic cell comprising an anode compartment and a cathode compartment, thereby electrolytically depositing a metal or metals from the chloride electrolyte, characterized in that a portion of the electrolyte in the anode compartment is withdrawn from below an anode of the anode compartment and is returned to the leaching step so as to increase the oxidation potential of the chloride leach liquor;

wherein said anode compartment and said cathode compartment are separated from one another by a diaphragm.

* * * * *